(12) United States Patent
Matsuyama

(10) Patent No.: US 8,452,642 B2
(45) Date of Patent: May 28, 2013

(54) NAVIGATION DEVICE AND METHOD FOR PROVIDING INFORMATION ON PARKING AREA

(75) Inventor: Shigeo Matsuyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 109 days.

(21) Appl. No.: 12/948,987

(22) Filed: Nov. 18, 2010

(65) Prior Publication Data
US 2011/0191266 A1    Aug. 4, 2011

(30) Foreign Application Priority Data
Feb. 2, 2010  (JP) .................................. 2010-21133

(51) Int. Cl.
G01C 21/26  (2006.01)
G07B 15/00  (2011.01)
G07B 15/02  (2011.01)

(52) U.S. Cl.
USPC ......................................................... 705/13

(58) Field of Classification Search
USPC ............... 705/13; 701/22, 62, 208; 340/932.2
See application file for complete search history.

(56) References Cited

U.S. PATENT DOCUMENTS

| | | | | |
|---|---|---|---|---|
| 5,790,976 A | * | 8/1998 | Boll et al. .................. | 455/456.5 |
| 6,081,205 A | * | 6/2000 | Williams ................... | 340/932.2 |
| 7,538,690 B1 | * | 5/2009 | Kaplan et al. ............. | 340/932.2 |
| 7,956,570 B2 | * | 6/2011 | Lowenthal et al. ........... | 320/104 |
| 2006/0250278 A1 | * | 11/2006 | Tillotson et al. ........... | 340/932.2 |
| 2009/0043520 A1 | * | 2/2009 | Pollack et al. .................. | 702/62 |
| 2009/0150073 A1 | * | 6/2009 | Caraballo ..................... | 701/210 |
| 2009/0174365 A1 | * | 7/2009 | Lowenthal et al. ........... | 320/109 |
| 2010/0161393 A1 | * | 6/2010 | Littrell .............................. | 705/13 |
| 2010/0169008 A1 | * | 7/2010 | Niwa et al. ..................... | 701/208 |
| 2010/0181957 A1 | * | 7/2010 | Goeltner ........................ | 320/101 |
| 2010/0191585 A1 | * | 7/2010 | Smith .............................. | 705/13 |
| 2010/0193261 A1 | * | 8/2010 | Freeman ........................ | 180/2.2 |
| 2010/0256846 A1 | * | 10/2010 | Shaffer ........................... | 701/22 |
| 2010/0274656 A1 | * | 10/2010 | Genschel et al. ............ | 705/14.27 |
| 2010/0301810 A1 | * | 12/2010 | Biondo et al. ............... | 320/155 |
| 2011/0011930 A1 | * | 1/2011 | Starr et al. .................... | 235/382 |
| 2011/0131154 A1 | * | 6/2011 | Faber et al. .................. | 705/418 |
| 2011/0153474 A1 | * | 6/2011 | Tormey et al. .................. | 705/31 |
| 2011/0241604 A1 | * | 10/2011 | Anderson ..................... | 320/101 |

FOREIGN PATENT DOCUMENTS

| | | | |
|---|---|---|---|
| JP | A-2000-353295 | | 12/2000 |
| JP | A-2004-069549 | | 3/2004 |
| JP | A-2007-199034 | | 8/2007 |
| JP | 2008172959 | * | 7/2008 |
| JP | A-2008-172959 | | 7/2008 |
| JP | A-2009-042095 | | 2/2009 |
| WO | WO2008/107767 | * | 9/2008 |

* cited by examiner

*Primary Examiner* — Brian Epstein
(74) *Attorney, Agent, or Firm* — Posz Law Group, PLC

(57) ABSTRACT

A vehicle includes a driving motor, a battery for the driving motor, a solar cell, and a control device for controlling charge of the battery using the solar cell and an external charge facility. A search unit searches a parking area near a present position of the vehicle or a destination. An information acquisition unit acquires charge-related information related to each parking area being searched. The charge-related information includes a capability of an external charge facility of each parking area, data of a usage fee of each parking area, and sunshine condition data of each parking area during a scheduled parking. A calculation unit calculates a charge cost for each parking area according to a remaining quantity of the battery, the charge-related information, and a time period of scheduled parking. A display unit indicates the calculated charge cost of each parking area.

5 Claims, 3 Drawing Sheets

| NAME | DISTANCE | SOLAR GENERATION | INFRA CHARGE | | CHARGE COST | EXPECTED CHARGE | PARKING FEE | TOTAL |
|---|---|---|---|---|---|---|---|---|
| PARKING A | 500m | 0kwh | QUICK | 18kwh | $11 | 100% | $6 | $59 |
| PARKING B | 300m | 1.0kwh | QUICK | 16kwh | $8 | 100% | $5 | $48 |
| PARKING C | 1000m | 2.5kwh | NORMAL | 12kwh | $3 | 80% | $4 | $35 |
| PARKING D | 800m | 2.5kwh | NORMAL | 10kwh | $2 | 70% | $4 | $32 |
| PARKING E | 800m | 2.5kwh | N/A | | $0 | 50% | $3 | $24 |

NAVIGATION DEVICE AND METHOD FOR PROVIDING INFORMATION ON PARKING AREA

CROSS REFERENCE TO RELATED APPLICATIONS

This application is based on and incorporates herein by reference Japanese Patent Application No. 2010-21133 filed on Feb. 2, 2010.

FIELD OF THE INVENTION

The present invention relates to a navigation device for a vehicle, the vehicle including a driving motor, a battery used as a power source for the driving motor, a solar cell, and a charge control device for controlling charge of the battery using the solar cell and an external charge facility. The present invention further relates to a method for providing information on a parking area to a user of the vehicle.

BACKGROUND OF THE INVENTION

In general, a car navigation device equipped in an automobile has a location function, a route guidance function, and a peripheral facility search function. The location function is for detecting the present position of the self-vehicle and superimposing the detected present position on a map indicated on a display device. The route guidance function is for searching for a recommended path to a destination specified by a user (driver) and guiding the user to the destination. The peripheral facility search function is for searching for a specified facility around the destination or the present position from a database according to a keyword such as a genre of the facility specified by the user. In recent years, an electric vehicle, which includes a driving motor energized by a battery (rechargeable battery) as a power source, and a plug-in type hybrid vehicle are generally used in order to cope with environmental and energy problems. A battery of such a vehicle can be charged at home by using, for example, a home power source. It is noted that an infrastructure such as a charge station and a parking lot having an external charge facility is being upgraded. Thereby, a paid service for charging a battery of such a vehicle will be available outside a house. For example, JP-A-2009-42095 and JP-A-2009-30993 propose an electric vehicle and a hybrid vehicle equipped with a solar cell for converting sunlight energy into electricity and storing electricity generated by the solar cell in a battery.

JP-A-2009-42095 proposes a navigation device configured to suggest a position where a vehicle is to be parked in a parking lot having a charge facility area, a sunlight charge area, and the like. JP-A-2009-30993 proposes a navigation device having a peripheral facility search function configured to search a parking lot having an external charge facility and guide a user to the searched parking lot. JP-A-2007-199034 and JP-A-2000-353295 disclose an automobile, which is equipped with a solar cell and a battery for storing generated electricity, and a navigation device for the automobile. The navigation device is configured to guide a path where a sunshine condition is excellent, and a solar cell can efficiently generate electricity. In the disclosure, the automobile is neither an electric vehicle nor a hybrid car. In such a vehicle (automobile) including a battery used as a power source of a driving motor and a solar cell, a user (driver) may want to charge the battery in preparation for next traveling, while parking the vehicle at a parking lot. When a solar cell of the self-vehicle is used for generating electricity to carry out the charge, electric fee is unnecessary thereby to carry out the charge cheaply. However, charge using the solar cell takes a long time. Alternatively, when a paid external charge facility is used for charge, the charge may be completed within a short time, though it requires a usage fee. It is predicted that the capability of the external charge facility, such as whether the external charge facility is configured to perform quick charge, and a usage fee for the external charge facility may differ among parking lots. Therefore, it is desirable that a user is provided with information for choosing a parking lot where the user parks the vehicle. Specifically, the information is about a charge quantity, by which the battery can be charged relative to a target charge quantity during the vehicle is parked in the condition where a solar cell is used or an external charge facility is used, and a cost required when an external charge facility is used. With the information, a user can make a determination whether charge using the solar cell is enough or whether charge using an external charge facility is better even though it requires payment.

JP-A-2007-199034 merely teaches an art to suggest a suitable parking position in a parking lot where the vehicle goes into. That is, JP-A-2007-199034 is irrelevant to selection of a parking lot. JP-A-2000-353295 merely teaches an art to search for parking lots near the self-vehicle position and indicate the searched parking lots. That is, JP-A-2000-353295 is irrelevant to information about a charge cost (price), which a user refers to when selecting a parking lot.

SUMMARY OF THE INVENTION

In view of the foregoing and other problems, it is an object of the present invention to produce a navigation device for a vehicle, the vehicle being equipped with a driving motor energized by a battery as a power source, the navigation device being configured to provide a user of suitable information about charge of the battery when the user searches for a parking lot. It is an object of the present invention to produce a method for providing information on a parking area to a user of the vehicle.

According to one aspect of the present invention, a navigation device for a vehicle, the vehicle including a driving motor, a battery used as a power source for the driving motor, a solar cell, and a charge control device for controlling charge of the battery using the solar cell and an external charge facility, the navigation device comprises a position detection unit configured to detect a present position of the vehicle. The navigation device further comprises a route guide unit configured to guide a recommended path to a set destination. The navigation device further comprises a parking area search unit configured to search a parking area near the present position or the destination. The navigation device further comprises an information acquisition unit configured to acquire charge-related information related to each parking area being searched, the charge-related information including a capability of an external charge facility of each parking area, data of a usage fee of each parking area, and sunshine condition data of each parking area during a scheduled parking. The navigation device further comprises a calculation unit configured to calculate a charge cost of each parking area according to a remaining quantity of the battery, the charge-related information, and a time period of scheduled parking. The navigation device further comprises a display unit configured to indicate the charge cost of each parking area calculated by the calculation unit.

According to another aspect of the present invention, a method for providing information on a parking area to a user of a vehicle, the vehicle including a driving motor, a battery used as a power source for the driving motor, a solar cell, and a charge control device for controlling charge of the battery using the solar cell and an external charge facility, the method comprises detecting a present position of the vehicle. The method further comprises searching a parking area near the present position or a destination. The method further comprises acquiring charge-related information related to each parking area being searched, the charge-related information including a capability of an external charge facility of each parking area, data of a usage fee of each parking area, and sunshine condition data of each parking area during a scheduled parking. The method further comprises calculating a charge cost of each parking area according to a remaining quantity of the battery, the charge-related information, and a time period of scheduled parking. The method further comprises indicating the calculated charge cost of each parking area.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

As follows, an embodiment of a navigation device applied to an electric vehicle will be described with reference to drawings. As generally known, an electric vehicle (passenger car) includes a motor for driving a wheel to cause the vehicle to travel and a battery 1 (FIG. 1) used as a power source of the motor. Specific illustration and description of the structure of the component of the electric vehicle such as a motor are presently omitted. The battery 1 employs, for example, a rechargeable lithium-ion battery. The battery may employ a capacitor configured to repeat charge and discharge.

Figure 1:
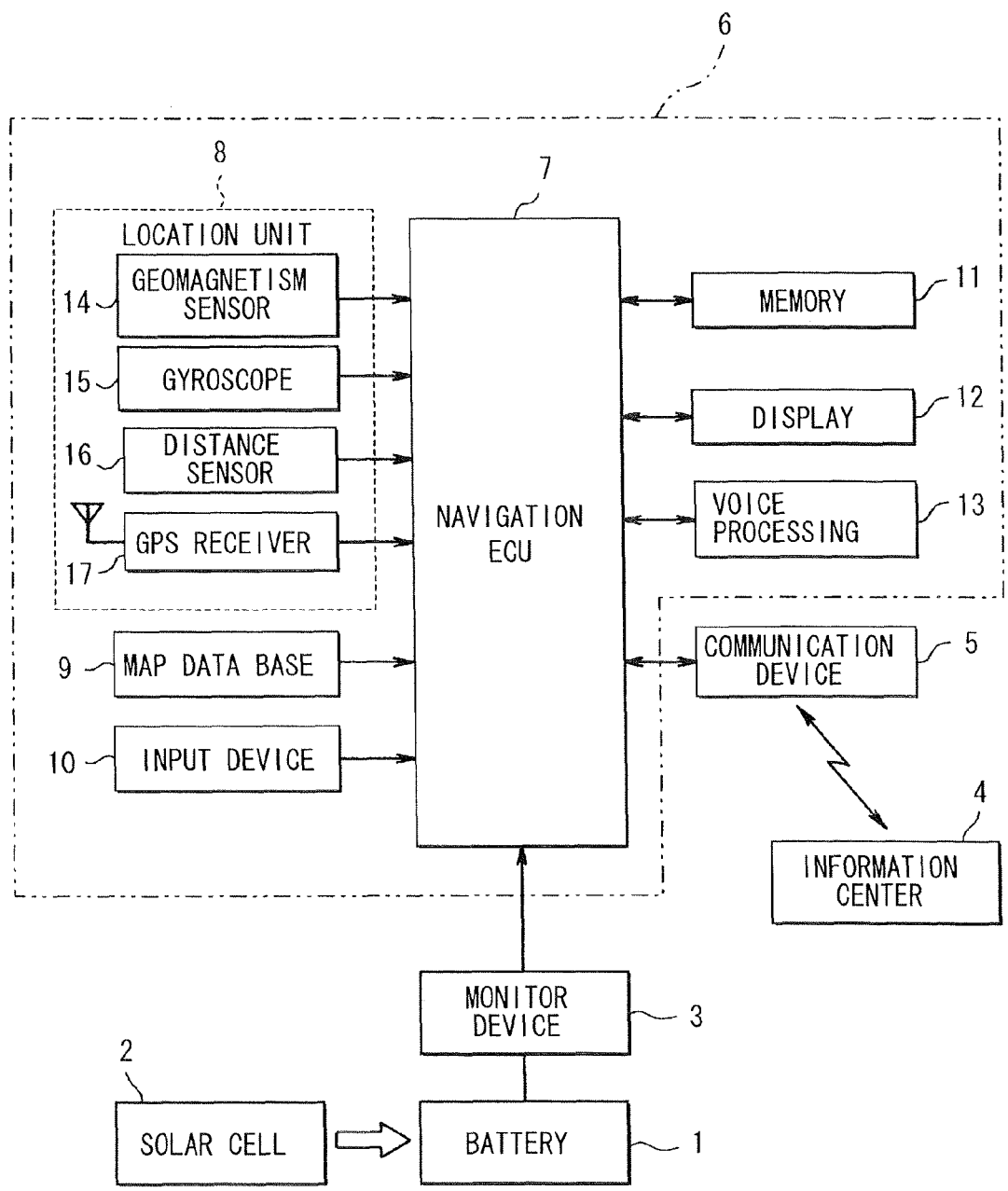
FIG. 1 is a block diagram showing an electric structure of a navigation device and relative components, according to one embodiment of the present invention.

As shown in FIG. 1, the vehicle includes a solar cell (solar panel) 2. As generally known, the solar cell 2 is configured to convert light energy of sunlight into electric energy. As irradiation of light (sunlight) becomes large, the solar cell 2 generates greater electricity. The vehicle is equipped with a battery monitor device 3 for monitoring output power of the battery 1, such as an output voltage and an output current. The battery monitor device 3 is configured to detect a state of charge (SOC: %) of the battery 1 regularly and indicate the SOC on a predetermined are of a meter unit, for example.

In general, a charge connector is equipped in a sidewall of the vehicle. Such a charge connector is attachable to and detachable from a plug of a power source for charging the battery. For example, the battery 1 can be charged at home using a home power source. In addition, the battery 1 can be also charged in a paid external charge facility provided in a charge station or a parking area. The battery 1 is further configured to be charged with electricity generated by the solar cell 2. The vehicle is equipped with a charge control device for controlling charge of the battery 1. As shown in an FIG. 1, the vehicle is equipped with an in-vehicle communication device 5 for performing wireless communications with an information service center 4 outside of the vehicle.

The vehicle is equipped with a navigation device 6 related to the present embodiment. FIG. 1 shows an overview of an electric structure of the navigation device 6. As follows, the navigation device 6 will be described in detail. The navigation device 6 is mainly configured of a computer. Specifically, the navigation device 6 includes a navigation ECU (control device) 7 for controlling the entire device.

The navigation ECU 7 is connected with a self-vehicle position detection unit (position detection unit) 8 for detecting the present position of the self-vehicle, a map data base 9, an operation input device (input unit) 10, an external memory 11 for storing various data, a display device (display unit) 12, and a voice processing device 13. The navigation ECU 7 is connected with the in-vehicle communication device 5. The navigation ECU 7 inputs a signal, which represents a remaining capacity, from the battery monitor device 3.

The self-vehicle position detection unit 8 includes a geomagnetism sensor 14, a gyroscope 15, a distance sensor 16, and a GPS receiver 17 for a global positioning system (GPS), each having a generally known structure. The GPS receiver 17 detects the position of the self-vehicle according to an electric wave transmitted from a GPS Satellite. The navigation ECU 7 is configured to detect the present position of the self-vehicle, a traveling direction, a speed, a travel distance, the present time, and the like with high accuracy according to input signals from the sensors 14 to 17 of the position detection unit 8. In consideration of accuracy, a part of the sensors 14 to 17 may be omitted. The sensors may further include a rotation sensor of a steering wheel, a wheel sensor of each wheel, and the like.

The map data base 9 includes a storage medium storing various data, such as road map data and facility data (destination data) associated with the road map data, and a drive device for reading the data. The map data storage medium may employ, for example, a large-scale storage media, such as a digital versatile disc (DVD) or a hard disk drive. The road map data includes data of a road geometry, a road width, a road name, a traffic signal, a crossing, a building, a facility, a place name, a geographical feature, and the like. The road map data further includes data for the playback the road map on the screen of the display device 12.

The facility data includes information about a transportation system, such as a station and an airport, a facility, such as a leisure facility, an accommodation, a parking lot (parking area), and a public facility, a store, such as a retail store, a department store, and a restaurant, a real estate, such as a residence and an apartment, a place-name, and the like. The facility data includes data of such a facility, such as a telephone number, an address, latitude and longitude, and the like. The facility data further includes data for superimposing a landmark representing a facility and the like on the road map and indicating the superimposed image on the screen of the display device 12. More specifically, the facility data is classified into various categories (genres) of facilities, such as a leisure facility, a parking lot, a convenience store, a fuel station, a restaurant, and a bank (ATM corner). In addition, a target object can be searched from the facility data by specifying a category, a name, a sold product (line of business), a special feature, an address (area), a telephone number, and the like. Thus, the facility data enables a peripheral institution search function.

The display device 12 includes a full color liquid crystal display, for example. The display device 12 is located at a center portion, such as an instrument panel, in a vehicle interior. The screen of the display device 12 indicates a navigation screen, such as a map screen, a screen for facility search, an initial setup screen, an image of a TV program, a playback image of a DVD, and the like. When parking lot search is performed, the screen of the display device 12 indicates a list of parking lots (refer to FIG. 3). In this case, a charge cost of each parking lot is also indicated. The present operation will be described later in detail.

As generally known, the screen of the display device 12 indicates road maps in various scales when indicating a navigation screen. Further, a pointer is superimposed on the indicated road map for specifying the present position and the traveling direction of the vehicle. Detailed illustration of the present function is presently omitted. When a route guidance function is in operation for guiding the vehicle to a destination, a path, on which the vehicle is supposed to travel, is superimposed on a road map. Further, various kinds of screens, on which a user inputs a destination and the like, and various kinds of messages are indicated.

The operation input device 10 includes a mechanical switch device provided near the screen of the display device 12 and a touch panel provided on the screen of the display device 12. Illustration of the present structure is presently, omitted. A user such as a driver can manipulate the operation input device 10 to input various kinds of commands for setting (selection) the destination and selecting the scale of the road map, for example. The operation input device 10 functions as an input unit configured to set (input) a target charge quantity and a scheduled parking time period. The present function will be describe later. The voice processing device 13 is configured to synthesize various messages for navigation and cause a speaker to output the various messages with synthetic voice.

The in-vehicle communication device 5 includes an in-vehicle high-speed data communication module (DCM), for example. The in-vehicle communication device 5 performs wireless communications with an external information service center 4. Thereby, the in-vehicle communication device 5 receives, for example, new map data for updating present map data, the present vehicle information (information for evading traffic congestion), and amusement information, such as music data. The in-vehicle communication device 5 further performs emergency communication (emergency call) when an accident occurs. The navigation device 6 according to the present embodiment is further configured to obtain charge-related information on each parking lot from the information service center 4. The present function will be described later.

The navigation ECU 7 has a software structure having a location function to obtain the present position (self-vehicle position) of the vehicle and a route guidance function to search for a path to a specified destination and guide a user to the destination. The navigation ECU 7 further has a peripheral facility search function to search a specified facility around the present position of the self-vehicle or a specified facility around the destination and notify a user of a search result, for example.

As described above, the location function is configured to cause the display device 12 to indicate the road map according to the map data obtained from the map data base 9. The location function is further configured to cause the display device 12 to indicate a present position mark according to a detection result of the self-vehicle position detection unit 8 to exhibit the present position of the vehicle and the traveling direction of the vehicle. In this case, the indicated present position moves on the map with traveling of the vehicle and the indicated map is scrolled according to the position of the vehicle. Simultaneously, map matching is performed to match the present position of the vehicle on the road.

The route guidance function is configured to calculate a recommended traveling path (route) from a start point (present position) of the vehicle to a destination specified by a user automatically by using, for example, a generally-known Dijkstra method. The route guidance function is further configured to guide the calculated route to the destination. In the route guidance, the screen of the display device 12 indicates the present position (present position mark) of the vehicle and the route, on which the vehicle is supposed to travel, in a conspicuous color on the road map. In addition, the voice processing device 13 performs guidance with a synthetic voice. Specifically the voice processing device 13 causes a synthetic voice of, for example, "go leftward at the intersection 200 meters ahead" when the vehicle approaches an intersection.

The peripheral facility search function is configured to cause the display device 12 to indicate, for example, a screen for keyword input or a screen for genre input when a user operates the operation input device 10 to instruct execution of the peripheral facility search. Thereby, the peripheral facility search function causes a user to specify a keyword or a genre of a facility to be searched. Further, the peripheral facility search function searches (extracts) a corresponding facility from the facility data of the map data base 4 according to the specified subject of the user. In general, multiple facilities are extracted and searched. The searched facilities are, for example, listed in ascending order of distance and indicated on the display device 12. Alternatively, the searched facilities are, for example, indicated on the display device 12 with landmark icons on the map. The searched facility may be designated as a destination, and route guidance to the destination may be performed.

According to the present embodiment, when a user instructs to search a parking lot around the present position, the navigation ECU 7 activates the peripheral facility search function to search a parking lot around the present position with reference to the map data base 9. Specifically, the peripheral facility search function searches a parking lot within a circle less than 1 kilometer in radius, for example. Alternatively, when the vehicle arrives at a destination other than a parking lot according to route guidance, the peripheral facility search function may search a parking lot around the destination (present position) automatically even when an instruction is not given. Specifically, in this case, the peripheral facility search function may search a parking lot around the destination within a circle less than 1 kilometer in radius, for example. In this way, the navigation ECU 7 functions as a parking area search unit.

Figure 3:
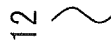
FIG. 3 is a view showing one example of charge cost.

The navigation ECU 7 has a software configuration to execute a charge cost calculation program to perform the parking lot search, calculate values of charge cost corresponding to searched parking lots, and indicate a list of the calculated values of charge cost on the screen of the display device 12. The present operation will be subsequently described with reference to a flow chart description. FIG. 3 shows an example of the indicated list. The list includes a charge quantity of the solar cell 2, a charge quantity and a fee to be paid when an external charge facility is used, an estimated charge rate, and a total fee including a parking fee, and the like, in a scheduled parking time period for each of the searched parking lots.

A user manipulates the operation input device 10 to input a scheduled parking time period and a target charge quantity of the battery 1 for calculating the charge cost. That is, a user specifies hours, for which the user parks the vehicle, and a target remaining capacity (%) to which the user requires to charge the battery 1. The navigation ECU 7 causes the in-vehicle communication device 5 to communicate with the information service center 4 to obtain the charge-related information on each of the searched parking lots from the information service center 4. The charge-related information includes data about each of the parking lots.

Specifically, the charge-related information includes information on whether a parking lot has an external charge facility and information on a performance of the external charge facility if available. Specifically, the information on a performance of the external charge facility includes information on whether an external charge facility is capable of quick charge or only capable of normal charge. The charge-related information further includes information on a usage fee of an external charge facility. Specifically, the information on a usage fee includes information on whether the usage fee is charged by a unit charge quantity or a unit charge time. The charge-related information further includes information on a parking fee. In addition, the charge-related information includes information on whether the parking lot is located outdoor to receive sunlight and data about weather, i.e., climate (sunshine condition) when the vehicle is to be parked. That is, the charge-related information includes sunshine condition data for predicting power generated by the solar cell 2. Simultaneously, data of a facility, a usage fee, and the like of each parking lot are collected, and the collected data is contained in the database of the information service center 4. In addition, data of the latest weather report (sunshine condition) and the like of each place are also collected.

Thus, the navigation ECU 7 calculates a charge cost for each parking lot according to the present remaining capacity of the battery 1 obtained from the battery monitor device 3, the obtained charge-related information, and the inputted scheduled parking time period. The navigation ECU 7 further causes the display device 12 to indicate the list of the charge cost. In this way, the navigation ECU 7 functions as a calculation unit. The navigation ECU 7 and the in-vehicle communication device 5 function as an information acquisition unit. A user may operate the operation input device 10 (touch panel) to select a parking lot, where the user wants to go, from the list currently indicated on the display device 12 and specify the selected parking lot as a destination.

Figure 2:
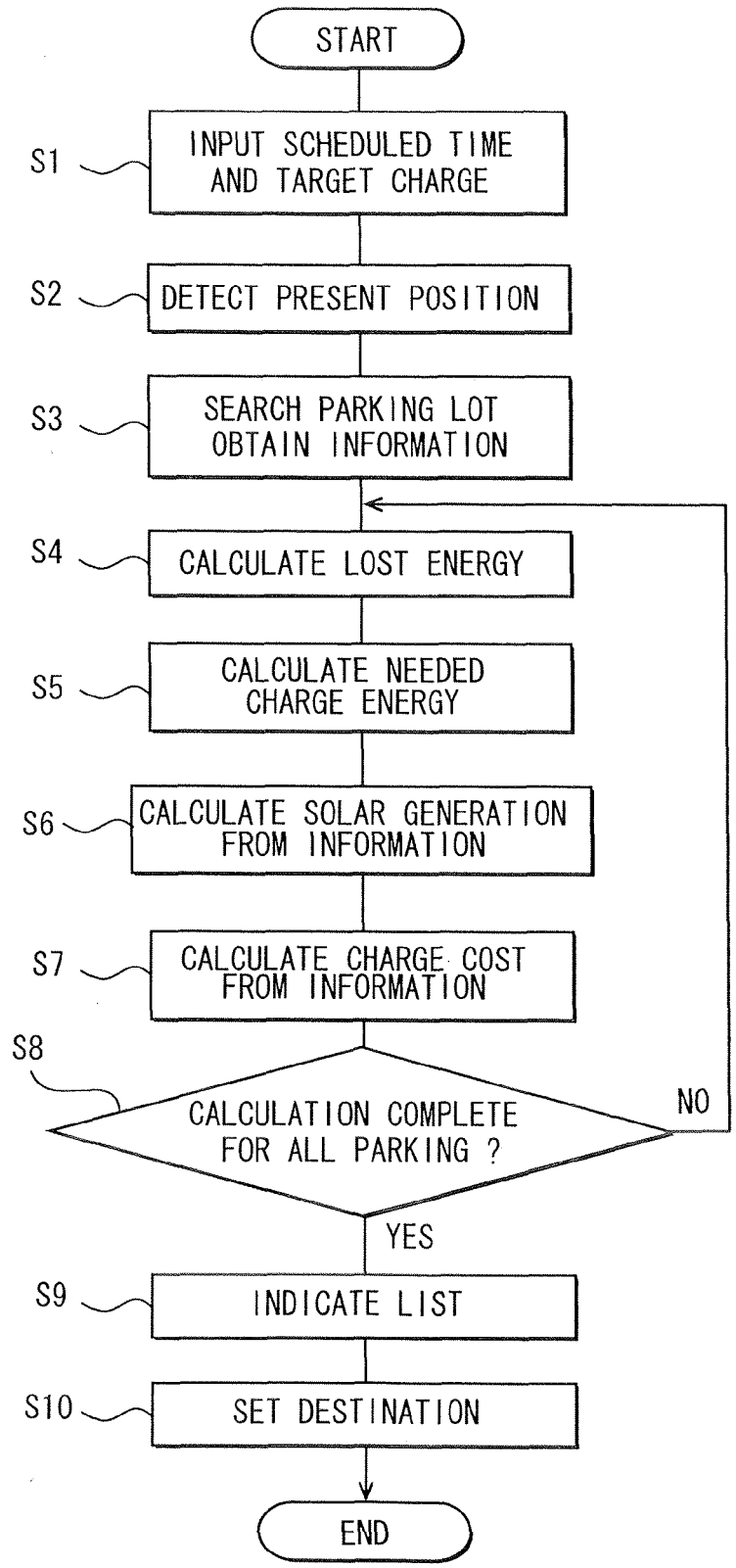
FIG. 2 is a flow chart showing a procedure for searching a parking lot.

As follows, an operation of the navigation device according to the present embodiment will be described with reference to FIGS. 2, 3. FIG. 2 is a flow chart showing a procedure, which the navigation ECU 7 executes for calculating a charge cost, when the navigation ECU 7 performs the facility search of a parking lot. FIG. 3 shows an example of a calculated list of the charge cost. As described above, when a user activates the peripheral facility search function to instruct to search a parking lot around the present position or when the vehicle arrives at a destination according to the route guidance, the processing shown in FIG. 2 is started.

At step S1, user's input of a scheduled parking time period and a target charge quantity (Goal_kwh) is accepted. In the present example, the present remaining capacity (Remain_kwh) of the battery 1 is 40% (12 kwh), the scheduled parking time period is 8 hours, and the target charge quantity is 100%. When a user does not feel like to spend money so much for charge, the target charge quantity may be set to a small value such as 50%. At step S2, the present position of the vehicle is detected.

At subsequent step S3, a parking lot, which exists around the present position in, for example, a circle within 1 kilometer in radius, is searched. In addition, the in-vehicle communication device 5 communicates with the information service center 4 to obtain the charge-related information of each searched parking lot from the information service center 4. In this case, multiple parking lots around the present position are searched, in general. In the present example, as shown in FIG. 3, it is assumed that five parking lots A to E are searched.

Search processings of step S4 to step S7 are executed for each of the searched parking lots. At step S4, a lost electric energy (Lost_kwh) of the battery 1 is first calculated. The lost electric energy (Lost_kwh) is a predicted energy to be consumed (lost) while the vehicle travels from the present position to a parking lot. At step S5, a needed charge electric energy (Need_kwh) is calculated. The needed charge electric energy (Need_kwh) is expressed by the subsequent equation with the target charge quantity (Goal_kwh), the remaining capacity (Remain_kwh), and the lost electric energy (Lost_kwh).

$$Need\_kwh = Goal\_kwh - Remain\_kwh - Lost\_kwh$$

At subsequent step S6, on assumption that the vehicle is parked at a corresponding parking lot for the scheduled parking time period, a solar energy generation quantity (Solar_kwh), by which the solar cell 2 can charge the battery 1, is calculated. The solar energy generation quantity is calculated according to an expected arrival time to the parking lot, a scheduled parking time period, and the sunshine condition data (weather forecast data) included in the charge-related information. When the sunshine condition is excellent (fine weather), the solar cell 2 generates greater electric energy. Alternatively, the solar cell 2 generates much smaller electric energy in rainy or cloudy weather or in the nighttime, for example. As exemplified by the parking lot A in FIG. 3, when the parking lot is located underground or in a roofed building, the solar cell 2 generates only a slight electric energy or non electric energy with lighting of a fluorescent light or the like.

At step S7, a charge quantity (infrastructure charge quantity (Plag_kwh)) from an external charge facility is calculated according to the expected arrival time to the parking lot, a scheduled parking time period, and the capability of the external charge facility of the parking lot. In this case, the infrastructure charge quantity (Plag_kwh) is expressed by the following formula with the needed charge electric energy (Need_kwh) and the solar energy generation quantity (Solar_kwh).

$$Plag\_kwh = Need\_kwh - Solar\_kwh$$

That is, insufficiency caused by the solar energy generation quantity is complemented with the charged from the external charge facility. Thus, the charge cost (usage fee of the external charge facility) is calculated from the infrastructure charge quantity.

When the capacity of the external charge facility is small, the charge quantity may not increase to the target charge quantity even after charge for the total scheduled parking time period. In that case, the infrastructure charge quantity and the charge cost are calculated to obtain the maximum charge quantity such that the charge quantity becomes close to the target charge quantity possibly. As exemplified by the parking lot E in FIG. 3, when the parking lot does not have an external charge facility, the charge quantity (usage fee) from the external charge facility becomes zero.

When processings of step S4 to step S7 are completed for all the parking lots A to E, step S8 makes a positive determination. In this case, the processing proceeds to step S9 at which the display device 12 is caused to indicate the listed charge cost shown in FIG. 3. The list is indicated as a table including the name of the parking lot, the distance from the present position (destination), the solar energy generation quantity, the infrastructure charge quantity, the charge cost, the expected charge quantity (expected remaining capacity of the battery 1) to be recoverable during the parking. In addition, the list includes the parking fee per unit time and the total usage fee of the external charge facility and the parking fee.

The user can select a parking lot with reference to the charge cost included in the list. For example, when a user strongly desires to increase the remaining capacity of the battery 1 completely to secure the charge quantity of 100%, the user may select the parking lot A or B. Alternatively, when a user desires to reduce expense prior to the charge quantity, the user may select the other parking lot C, D, or E. At step S10, determination of the destination by a user is accepted. That is, selection of one of the parking lots is accepted. Thus, the processing is completed. Thereafter, route guidance to the set destination is performed.

According to the present embodiment, suitable information about charge of the battery 1 and a charge cost for each parking lot can be provided to a user on instruction to search a parking lot. Specifically, a user can be provided with information on an available charge quantity relative to the target charge quantity of the battery 1 and a cost needed when an external charge facility is used within the parking time for each of the cases where the solar cell 2 is used or the external charge facility is used and for each parking lot. In this way, a user can obtain the information, thereby the user is enabled to determine according to the information whether it is sufficient to charge only with the solar cell 2 or it is better to use an external charge facility even though it is a paid service. Thus, a user can select a charging method and an optimal parking lot to be used.

According to the present embodiment, in particular, the navigation device is configured to indicate the cost including the parking cost for the parking lot. Therefore, a user is enabled to determine a parking lot to park the vehicle in consideration of the cost including the parking cost and the charge cost when using a paid parking lot. Thus, convenience can be further promoted. Further, according to the present embodiment, a user can instruct the target charge quantity of the battery 1. Therefore, in the case where a user need not secure the target charge quantity of 100%, the user can select a cheaper parking lot.

In the embodiment, the information acquisition unit communicates with the information service center 4 outside of the vehicle to obtain the charge-related information on each parking lot from the information service center 4 via communications. Alternatively, the charge-related information may be stored in, for example, the map data base 9, and the stored charge-related information may be read and utilized. The weather information (sunshine condition data) may be obtained from a radio broadcast, television broadcast, or the like. Alternatively, weather may be predicted according to detection signals of a sun sensor or a moisture sensor equipped to the vehicle.

In the embodiment, a parking lot is searched by using the map data base 9. Alternatively, the information service center 4 may execute processings for the facility search and/or the path search, and the vehicle may receive the processed data from the information service center 4. In the embodiment, the display device 12 is configured to indicate the charge cost in the form of a list. Alternatively, the charge cost may be superimposed on the map screen showing the position of the parking lot. Various indication forms can be employed for exhibiting the charge cost of each parking lot. The above-described device and method are applicable not only to an electric vehicle but also to a hybrid vehicle, such as a plug-in hybrid vehicle, employing both a driving motor and an engine.

Summarizing the above embodiment, a navigation device is equipped in a vehicle. The vehicle is provided with a driving motor, which uses a battery as a power source. The navigation device includes: a parking area search unit configured to search a parking lot (parking area) near a present position of a self-vehicle or a destination; an information acquisition unit configured to obtain charge-related information related to each searched parking area, the charge-related information including a capability of an external charge facility of the parking lot, data of a usage fee, and sunshine condition data of the parking lot during a scheduled parking; a calculation unit configured to calculate a charge cost for each parking lot according to a remaining quantity of the battery, the charge-related information, and a time period of scheduled parking; and a display unit configured to indicate the charge cost of each parking lot calculated by the calculation unit.

According to the present structure, the charge-related information obtained by the information acquisition unit includes the capability of the external charge facility of each parking lot and the data of the usage fee. Therefore, the calculation unit can calculate a charge quantity by which the battery can be charged using an external charge facility in a parking time period and a charge cost required in this case, according to the charge-related information, the remaining quantity of the battery, and the time period of scheduled parking. Furthermore, a charge quantity, by which the battery can be charged by the solar cell equipped to the self-vehicle, can be determined according to the sunshine condition data of the charge-related information. Charging of the battery using the solar cell does not cost.

Therefore, the display unit indicates suitable information about charge of the battery for each parking lot can be provided to a user. Specifically, a user can be provided with information on an available charge quantity relative to the target charge quantity of the battery and a cost needed when an external charge facility is used within the parking time for each of the cases where the solar cell is used or the external charge facility is used and for each parking lot. In this way, the user can know the information. Thus, the user is enabled to select a charging method to be employed and an optimal parking lot according to the information.

The display unit may be configured to indicate a cost including a parking fee of each parking lot in the case where the vehicle is parked for the time period of scheduled parking. In this way, a user is enabled to determine a parking lot where the vehicle is to be parked in consideration of the cost including the parking fee in addition to the charge cost in the condition where the searched parking lot is a paid parking lot.

The input unit may be further configured to enable a user to instruct a target charge quantity of the battery during the vehicle is parked in a parking lot. The calculation unit may calculate the charge cost for each parking lot in consideration of the target charge quantity. According to the present configuration, a user may input a needed target charge quantity into the input unit thereby to cause the calculation unit to calculate the charge cost according to the inputted target charge quantity. It is effective when the target charge quantity of 100% need not be necessarily secured. The above processings such as calculations and determinations are not limited being executed by the navigation ECU 7. The control unit may have various structures including the navigation ECU 7 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A navigation device for a vehicle, the vehicle including a driving motor, a battery used as a power source for the driving motor, a solar cell, and a charge control device for controlling charge of the battery using the solar cell and an external charge facility, the navigation device comprising:
    a position detector configured to detect a present position of the vehicle;
    a route guide unit configured to guide a recommended path to a set destination;
    a parking area search unit configured to search a parking area near the present position or the destination;
    an information acquisition unit configured to acquire charge-related information related to each parking area being searched, the charge-related information including a capability of an external charge facility of each parking area, data of a usage fee of each parking area, and sunshine condition data of each parking area during a scheduled parking;
    a calculation unit configured to calculate, according to the charge-related information,
        a solar energy generation quantity, by which the solar cell can charge the battery, on an assumption that the vehicle is parked at each parking area for a time period of scheduled parking,
        an insufficiency caused by the solar energy generation quantity to charge a remaining quantity of the battery, and
        a charge cost caused by complementing the insufficiency to charge with an external charge facility; and
    a display unit configured to indicate the charge cost of each parking area calculated by the calculation unit.

2. The navigation device according to claim 1, wherein the display unit is further configured to indicate a cost including a parking fee of each parking area in the case where the vehicle is parked for the time period of scheduled parking.

3. The navigation device according to claim 1, further comprising:
    an input unit configured to enable a user to specify a target charge quantity of the battery during the vehicle is parked in a parking area, wherein
    the calculation unit is further configured to calculate the charge cost for each parking area in consideration of the target charge quantity.

4. A method for providing information on a parking area to a user of a vehicle, the vehicle including a driving motor, a battery used as a power source for the driving motor, a solar cell, and a charge control device for controlling charge of the battery using the solar cell and an external charge facility, the method comprising:
    detecting, in a position detector of the vehicle, a present position of the vehicle;
    searching, in a navigation device of the vehicle, a parking area near the present position or a destination;
    acquiring, in the navigation device, charge-related information related to each parking area being searched, the charge-related information including a capability of an external charge facility of each parking area, data of a usage fee of each parking area, and sunshine condition data of each parking area during a scheduled parking;
    calculating, in the navigation device, according to the charge-related information,
        a solar energy generation quantity, by which the solar cell can charge the battery, on an assumption that the vehicle is parked at each parking area for a time period of scheduled parking,
        an insufficiency caused by the solar energy generation quantity to charge a remaining quantity of the battery, and
        a charge cost caused by complementing the insufficiency to charge with an external charge facility; and
    indicating the calculated charge cost of each parking area.

5. A non-transitory computer readable medium comprising instructions executed by a computer, the instructions including a method for providing information on a parking area to a user of a vehicle, the vehicle including a driving motor, a battery used as a power source for the driving motor, a solar cell, and a charge control device for controlling charge of the battery using the solar cell and an external charge facility, the method comprising:
    detecting a present position of the vehicle;
    searching a parking area near the present position or a destination:
    acquiring charge-related information related to each parking area being searched, the charge-related information including a capability of an external charge facility of each parking area, data of a usage fee of each parking area, and sunshine condition data of each parking area during a scheduled parking;
    calculating, according to the charge-related information,
        solar energy generation quantity, by which the solar cell can charge the battery, on assumption that the vehicle is parked at each parking area for a time period of scheduled parking,
        insufficiency caused by the solar energy generation quantity to charge a remaining quantity of the battery, and
        a charge cost caused by complementing the insufficiency with charge with an external charge facility; and
    indicating the calculated charge cost of each parking area.

* * * * *